United States Patent Office.

NATHAN C. RUSSELL, OF GLOVERSVILLE, NEW YORK.

*Letters Patent No.* 93,910, *dated August* 17, 1869; *reissue No.* 3,816, *dated February* 1, 1870.

IMPROVEMENT IN THE TREATMENT OF LEATHER.

The Schedule referred to in these Letters Patent and making part of the same.

*To all whom it may concern:*

Be it known that I, NATHAN C. RUSSELL, of Gloversville, in the county of Fulton, and State of New York, have invented a new and useful Improvement in the Preparation of Leather; and I do hereby declare that the following is a full, clear, and exact description of the same.

My invention consists in a novel treatment of what is known as "bark-tanned lamb or sheep-skin," an article used by book-binders, and which, while sufficiently soft and supple for the purposes of their trade, is too hard and stiff for glove-making, and a variety of other purposes. This objection is removed by my treatment of the article, and the latter rendered so soft and free, yet full in respect of body, as to adapt it, among other purposes or uses, to the making of what are termed "dog-skin gloves."

The principal feature of the invention consists in the employment of what is known amongst tanners and others, as "fat liquor," which is ordinarily obtained by scouring deer-skin after tanning in oil, but which, when it is not convenient to obtain in this manner, may be produced, or a liquor having the same character obtained, by the cutting of oil with a suitable alkali.

In treating leather with the "fat liquor," it is desirable to heat the latter to or near the boiling-point, and it is preferred to use the same in connection with other ingredients. Thus, for instance, there may be added to each ten gallons (10 gals.) of such heated fat liquor, eight ounces (8 oz.) of sal-soda, twelve ounces (12 oz.) of common salt, one pint (1 pt.) of soft soap, or an equivalent quantity of hard soap, and four ounces (4 oz.) of Venetian red, such ingredients to be well stirred and mixed with the fat liquor.

This forms a good treating-mixture or compound, and when made in the foregoing quantity, will suffice for five or six dozen skins; but of course such quantity may be more or less varied, as may also the proportions of the ingredients, and the Venetian red, or other coloring-matter, be modified or omitted, as desired.

To effect the treatment, hereinbefore referred to, of the bark-tanned lamb or sheep-skin, the same should be well dipped in or saturated with the fat liquor or compound of which fat liquor is the base. This may be done by laying the skin to be treated on a table or other suitable surface, and rubbing the fat liquor, or compound on or into both sides of the skin, using, for the purpose, a horse or other suitable brush, or rubber, by which it can be worked into the skin, that is afterward hung out to dry, and subsequently "staked," when the character of said skin will be found entirely changed from harshness to softness, and in other respects, thereby adapting it to the manufacture of gloves of the description previously named, and to a variety of other purposes for which said skin was not suitable prior to the treatment of it I have herein described.

What is here claimed, and desired to be secured by Letters Patent, is—

1. The employment of fat liquor in the treatment of leather, substantially as specified.

2. The process, substantially as herein described, of treating bark-tanned lamb or sheep-skin, by means of a compound composed and applied essentially as specified.

N. C. RUSSELL.

Witnesses:
FRED. HAYNES,
FERD. TUSCH.